United States Patent
Golgiri et al.

(10) Patent No.: US 10,908,603 B2
(45) Date of Patent: Feb. 2, 2021

(54) METHODS AND APPARATUS TO FACILITATE REMOTE-CONTROLLED MANEUVERS

(71) Applicant: Ford Global Technologies, LLC, Dearborn, MI (US)

(72) Inventors: Hamid M. Golgiri, Livonia, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 193 days.

(21) Appl. No.: 16/154,421

(22) Filed: Oct. 8, 2018

(65) Prior Publication Data
US 2020/0110402 A1 Apr. 9, 2020

(51) Int. Cl.
G05D 1/00 (2006.01)
B62D 13/06 (2006.01)
A63H 17/42 (2006.01)
A63H 30/04 (2006.01)

(52) U.S. Cl.
CPC .......... *G05D 1/0016* (2013.01); *A63H 17/42* (2013.01); *A63H 30/04* (2013.01); *B62D 13/06* (2013.01); *G05D 1/0044* (2013.01); *G05D 1/0055* (2013.01); *G05D 2201/0213* (2013.01)

(58) Field of Classification Search
CPC .. G05D 1/0016; G05D 1/0044; G05D 1/0055; G05D 2201/0213; A63H 17/42; A63H 30/04; B62D 13/06
See application file for complete search history.

(56) References Cited

U.S. PATENT DOCUMENTS

| | | | |
|---|---|---|---|
| 5,959,724 A | 9/1999 | Izumi |
| 6,275,754 B1 | 8/2001 | Shimizu |
| 6,356,828 B1 | 3/2002 | Shimizu |
| 6,452,617 B1 | 9/2002 | Bates |
| 6,476,730 B2 | 11/2002 | Kakinami |
| 6,477,260 B1 | 11/2002 | Shimomura |
| 6,657,555 B2 | 12/2003 | Shimizu |
| 6,683,539 B2 | 1/2004 | Trajkovic |

(Continued)

FOREIGN PATENT DOCUMENTS

| | | |
|---|---|---|
| CN | 101929921 A | 12/2010 |
| CN | 103818204 A | 5/2014 |

(Continued)

OTHER PUBLICATIONS

US 9,772,406 B2, 09/2017, Liu (withdrawn)

(Continued)

*Primary Examiner* — Dale W Hilgendorf
(74) *Attorney, Agent, or Firm* — Frank Lollo; Eversheds Sutherland (US) LLP

(57) ABSTRACT

Methods and apparatus are disclosed to facilitate remote-controlled maneuvers. An example vehicle comprises: wheels, a transceiver, and a processor and memory. The processor is in communication with a remote device via the transceiver and is configured to: determine whether first and second buttons of the remote device are pressed based on signals from the remote device, if the first and second buttons are released, stop rotation of the wheels, and communicate a message regarding the released first and second buttons to the remote device.

18 Claims, 7 Drawing Sheets

(56) References Cited

U.S. PATENT DOCUMENTS

| | | |
|---|---|---|
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,587,681 B2 | 11/2013 | Guidash |
| 8,594,616 B2 | 11/2013 | Gusikhin |
| 8,599,043 B2 | 12/2013 | Kadowaki |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |
| 2010/0114471 A1 | 5/2010 | Sugiyama |
| 2010/0114488 A1 | 5/2010 | Khamharn |
| 2010/0136944 A1 | 6/2010 | Taylor |
| 2010/0152972 A1 | 6/2010 | Attard |
| 2010/0156672 A1 | 6/2010 | Yoo |
| 2010/0245277 A1 | 9/2010 | Nakao |
| 2010/0259420 A1 | 10/2010 | Von Rehyer |
| 2011/0071725 A1 | 3/2011 | Kleve |
| 2011/0082613 A1 | 4/2011 | Oetiker |
| 2011/0190972 A1 | 8/2011 | Timmons |

(56) References Cited

U.S. PATENT DOCUMENTS

| | | |
|---|---|---|
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0011584 A1* | 1/2014 | Shin et al. .............. A63F 13/22 463/31 |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1* | 8/2014 | Matters et al. ....... G05D 1/0016 701/2 |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0241767 A1* | 8/2016 | Cho et al. ............ G05D 1/0016 |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |
| 2017/0208438 A1 | 7/2017 | Dickow |
| 2017/0216474 A1* | 8/2017 | Kelsen .................. A63H 30/04 |
| 2017/0297385 A1 | 10/2017 | Kim |
| 2017/0297620 A1 | 10/2017 | Lavoie et al. |
| 2017/0301241 A1 | 10/2017 | Urhahne |

(56) References Cited

U.S. PATENT DOCUMENTS

| | | |
|---|---|---|
| 2017/0308075 A1 | 10/2017 | Whitaker |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner |
| 2018/0043884 A1 | 2/2018 | Johnson |
| 2018/0056939 A1 | 3/2018 | van Roermund |
| 2018/0056989 A1 | 3/2018 | Donald |
| 2018/0082588 A1* | 3/2018 | Hoffman, Jr. et al. ............... G05D 1/0088 |
| 2018/0088330 A1 | 3/2018 | Giannuzzi |
| 2018/0093663 A1 | 4/2018 | Kim |
| 2018/0105165 A1 | 4/2018 | Alarcon |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1 | 2/2019 | Parazynski |
| 2019/0066503 A1 | 2/2019 | Li |
| 2019/0103027 A1 | 4/2019 | Wheeler |
| 2019/0137990 A1 | 5/2019 | Golgiri |
| 2019/0167059 A1* | 6/2019 | Brown et al. ........ G05D 1/0016 |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102009060169 A1 | 6/2013 |
| DE | 102011080148 A1 | 7/2013 |
| DE | 102012200725 A1 | 9/2013 |
| DE | 102009051055 A1 | 10/2013 |
| DE | 102010034129 B4 | 10/2013 |
| DE | 102011122421 A1 | 6/2014 |
| DE | 102012008858 A1 | 6/2014 |
| DE | 102013016342 A1 | 1/2015 |
| DE | 102013019904 A1 | 2/2015 |
| DE | 102012215218 A1 | 4/2015 |
| DE | 102012222972 A1 | 5/2015 |
| DE | 102013004214 A1 | 5/2015 |
| DE | 102013019771 A1 | 12/2015 |
| DE | 102013213064 A1 | 2/2016 |
| DE | 102014007915 A1 | 2/2016 |
| DE | 102014011802 A1 | 2/2016 |
| DE | 102014009077 A1 | 4/2016 |
| DE | 102014226458 A1 | 6/2016 |
| DE | 102014011864 A1 | 12/2016 |
| DE | 102015209976 A1 | 12/2016 |
| DE | 102015216101 A1 | 3/2017 |
| DE | 102014015655 A1 | 5/2017 |
| DE | 102014111570 A1 | 6/2017 |
| DE | 102016214433 A1 | 6/2017 |
| DE | 102015209976 A1 | 7/2017 |
| DE | 102015221224 A1 | 12/2017 |
| DE | 102016214433 A1 | 2/2018 |
| DE | 102016211021 A1 | 6/2018 |
| DE | 102016224529 A1 | 6/2018 |
| EP | 2653367 A1 | 6/2000 |
| EP | 2289768 A2 | 10/2013 |
| EP | 2295281 A1 | 3/2016 |
| EP | 2135788 B1 | 6/2016 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 5586450 B2 | 5/2004 |
| JP | 5918683 B2 | 10/2004 |
| JP | 2000293797 A | 7/2005 |
| JP | 2004142543 A | 4/2009 |
| JP | 2016119032 A | 4/2009 |
| JP | 2018052188 A | 1/2010 |
| JP | 2004287884 A | 7/2014 |
| JP | 2005193742 A | 7/2014 |
| JP | 2009090850 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20160051993 A | 1/2010 |
| KR | 101641267 B | 9/2013 |
| KR | 20090040024 A | 4/2016 |
| KR | 20100006714 A | 5/2016 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2011/141096 A1 | 7/2014 |
| WO | WO 2013/056959 A1 | 5/2015 |
| WO | WO 2013/123813 A1 | 12/2015 |
| WO | WO 2014/103492 A1 | 3/2016 |
| WO | WO 2015/068032 A1 | 8/2016 |
| WO | WO 2015/193058 A1 | 9/2016 |
| WO | WO 2016/046269 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017112444 A1 | 6/2017 |
| WO | WO 2017/096728 A1 | 7/2017 |
| WO | WO 2017/097942 A1 | 7/2017 |

OTHER PUBLICATIONS

Alberto Broggi and Elena Cardarelli, Vehicle Detection for Autonomous Parking Using a Soft-Cascade ADA Boost Classifier, Jun. 8, 2014.

Al-Sherbaz, Ali et al., Hybridisation of GNSS with other wireless/sensors technologies on board smartphones to offer seamless outdoors-indoors positioning for LBS applications, Apr. 2016, 3 pages.

Automatically Into the Parking Space—https://www.mercedes-benz.com/en/mercedes-benz/next/automation/automatically-into-the-parking-space/; Oct. 27, 2014.

(56) References Cited

OTHER PUBLICATIONS

Bill Howard, Bosch's View of the Future Car: Truly Keyless Entry, Haptic Feedback, Smart Parking, Cybersecurity, Jan. 9, 2017, 8 Pages.
Core System Requirements Specification (SyRS), Jun. 30, 2011, Research and Innovative Technology Administration.
Daimler AG, Remote Parking Pilot, Mar. 2016 (3 Pages).
Jingbin Liu, IParking: An Intelligent Indoor Location-Based Smartphone Parking Service, Oct. 31, 2012, 15 pages.
Land Rover develops a smartphone remote control for its SUVs, James Vincent, Jun. 18, 2015.
Perpendicular Parking—https://prezi.com/toqmfyxriksl/perpendicular-parking/.
Search Report dated Jan. 19, 2018 for GB Patent Application No. 1711988.4 (3 pages).
Search Report dated Jul. 11, 2017 for GB Patent Application No. 1700447.4 (3 Pages).
Search Report dated May 21, 2018 for Great Britain Patent Application No. GB 1800277.4 (5 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual v2018.44. Oct. 29, 2018.
Vehicle's Orientation Measurement Method by Single-Camera Image Using Known-Shaped Planar Object, Nozomu Araki, Takao Sato, Yasuo Konishi and Hiroyuki Ishigaki, 2010.
Land Rover, *Land Rover Remote Control via Iphone RC Range Rover Sport Showcase—Autogefühl*, Retrieved from https://www.youtube.com/watch?v=4ZaaYNaEFio (at 43 seconds and 1 minute 42 seconds), Sep. 16, 2015.

* cited by examiner

METHODS AND APPARATUS TO FACILITATE REMOTE-CONTROLLED MANEUVERS

TECHNICAL FIELD

The present disclosure generally relates to automated vehicle features and, more specifically, remote-controlled vehicle maneuvers.

BACKGROUND

In recent years, vehicles have been equipped with automated vehicle maneuvering features such as parallel parking assistance, trailer-hitching assistance, braking assistance, etc. Automated vehicle maneuvering features often make vehicles more enjoyable to drive, alert drivers to potential obstructions, and/or assist drivers in making relatively precise maneuvers. Information from automated vehicle maneuvering features is often presented to a driver via an interface of a vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example vehicle is disclosed. The vehicle comprises: wheels, a transceiver, and a processor and memory. The processor is in communication with a remote device via the transceiver and is configured to: determine whether first and second buttons of the remote device are pressed based on signals from the remote device, if the first and second buttons are released, stop rotation of the wheels, and communicate a message regarding the released first and second buttons to the remote device.

An example method is disclosed. The method comprises: determining, with a processor, whether first and second buttons of a remote device are pressed based on signals from the remote device; stopping, with the processor, rotation of wheels of a vehicle if the first and second buttons are released; and communicating, with the processor, a message regarding the released first and second buttons to the remote device.

An example system is disclosed. The system comprises: a remote device and a vehicle. The remote device comprises a display and physical first and second buttons and is configured to display a graphical interface. The graphical interface has a virtual steering knob and a direction selector. The vehicle comprises wheels, a transceiver, and a processor and memory. The processor and memory are in communication with the remote device via the transceiver and are configured to: control the wheels based on inputs made to the remote device via the graphical interface; determine whether the first and second buttons are pressed based on signals from the remote device; if the first and second buttons are released, stop rotation of the wheels; and communicate a message regarding the released first and second buttons to the remote device.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
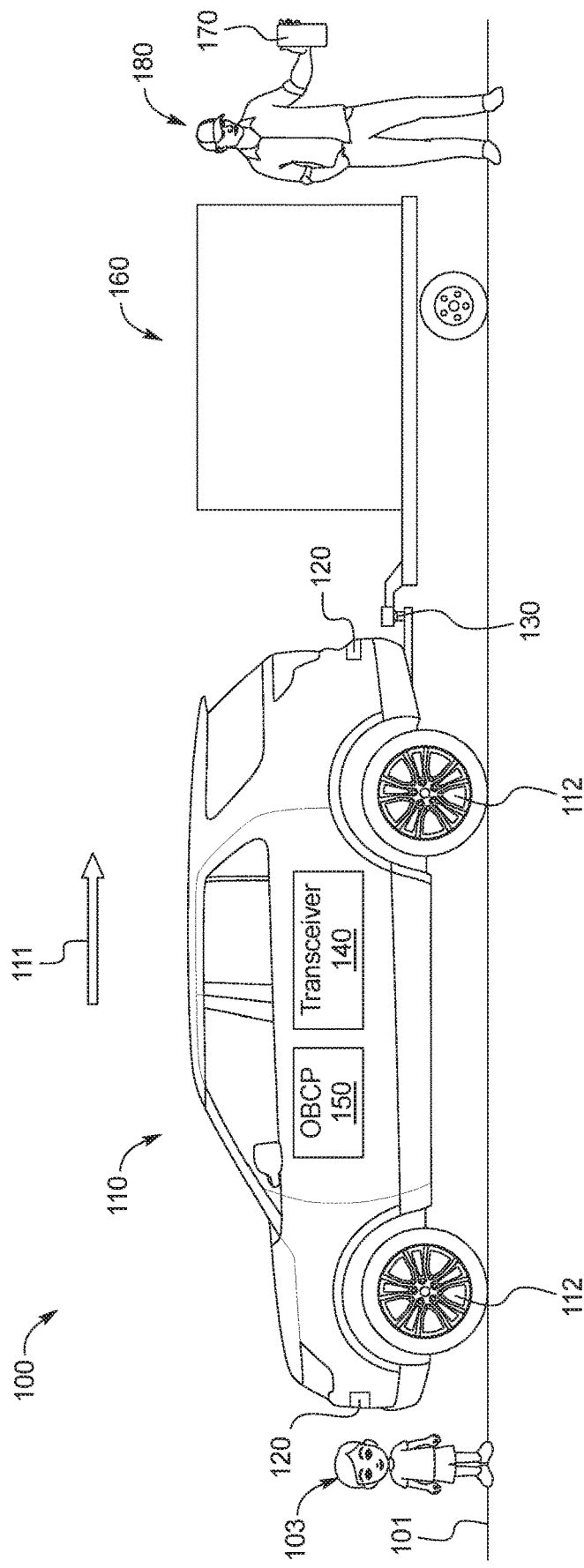
FIG. 1 is a side schematic view of a vehicle operating in accordance with the teachings of this disclosure in an environment.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Automated vehicle maneuvering features include parallel parking assistance, trailer-hitching assistance, trailer reversing assistance, and braking assistance, among others. Parallel parking assistance detects and steers a vehicle into a parallel parking spot. Trailer-hitching assistance detects and steers a vehicle to a trailer hitch coupler. Trailer reversing assistance modulates driver steering input to reverse a hitch trailer along a desired path. Braking assistance automatically slows and/or stops a vehicle when a pedestrian or other obstruction is detected near a vehicle.

Traditionally, with trailer reversing assistance, a vehicle determines steering and counter-steering angles while traveling in reverse to push a hitched trailer along a curved path. The driver is instructed to input steering commands via a knob mounted in the vehicle instead of via the steering wheel. An algorithm determines how to angle the steered wheels for the vehicle to move the hitched trailer along the curved path input by the driver via the knob. However, this precludes the driver from monitoring the trailer's and the vehicle's approach toward curbs and/or other obstacles (e.g., pedestrians, animals, etc.) that may be blocked from view from inside the vehicle.

This disclosure provides methods and apparatus to remotely control vehicle maneuvers. By remotely controlling vehicle maneuvers, a driver may monitor a vehicle's surroundings from outside the vehicle while reversing a trailer. By monitoring a vehicle's surroundings, the vehicle may be stopped before the vehicle and/or the trailer contact an obstacle.

Figure 2:
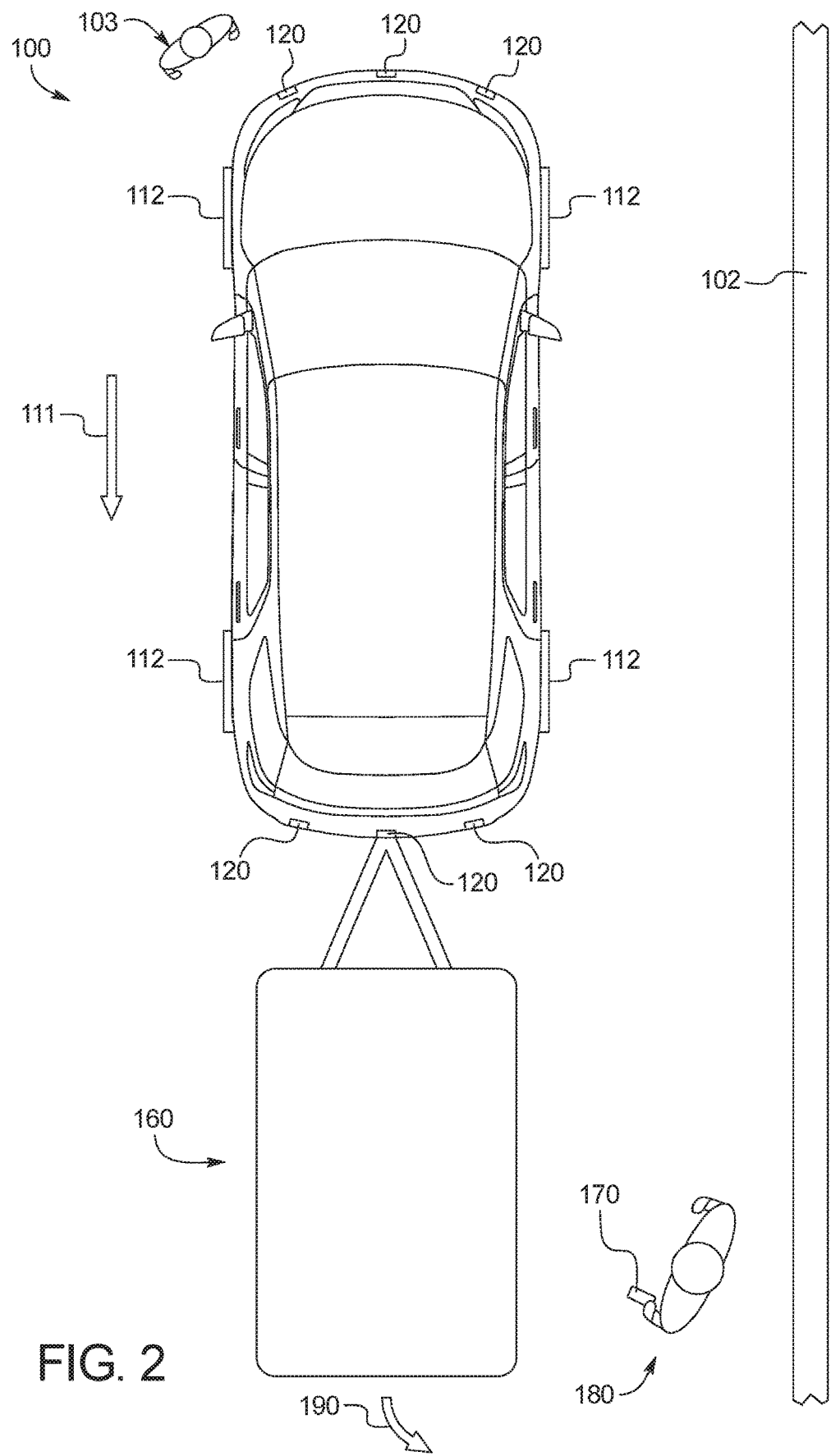
FIG. 2 is a top schematic view of the vehicle of FIG. 1.

FIG. 1 is a side schematic view of a vehicle 110 operating in in an environment 100. FIG. 2 is a top schematic view of the vehicle 110.

As shown in FIGS. 1 and 2, the environment 100 includes a roadway 101, an obstacle 102 (shown as a curb), a pedestrian 103 (shown as a child) the vehicle 110, a remote device 170, a driver 180, and a trailer 160. The vehicle 110 and the trailer 160 are hitched together. An arrow 111 shown in FIG. 1 indicates that the vehicle 110 and trailer 160 are traveling in reverse. In the example of FIG. 1, the driver 180 is outside the vehicle 110 to monitor the vehicle's 110 progress. The driver 180 controls the vehicle's 110 movement along a path 190 via the remote device 170. The vehicle 110 steers itself for joined the trailer 160 and the vehicle 110 to follow the path 190 indicated by the driver 180.

The vehicle 110 may be a standard gasoline powered vehicle, a hybrid vehicle, an electric vehicle, a fuel cell vehicle, and/or any other mobility implement type of vehicle. The vehicle 110 includes parts related to mobility, such as a powertrain with an engine, a transmission, a suspension, a driveshaft, and/or wheels, etc. The vehicle 110 may be non-autonomous, semi-autonomous (e.g., some routine motive functions controlled by the vehicle 110), or autonomous (e.g., motive functions are controlled by the vehicle 110 without direct driver input). As shown in FIG. 1 the vehicle 110 includes wheels 112, sensors 120, a towing hitch 130, a transceiver 140, and an on board computing platform (OBCP) 150.

The trailer 160 includes is configured to receive and secure with the towing hitch 130. Thus, the trailer 160 may be swingably connected to the vehicle 110 via the towing hitch 130.

The vehicle 110 is in communication with the remote device 170 via the transceiver 140.

The sensors 120 may be arranged in and around the vehicle 110 in any suitable fashion. The sensors 120 may be mounted to measure properties around the exterior of the vehicle 110. Additionally, some sensors 120 may be mounted inside the cabin of the vehicle 110 or in the body of the vehicle 110 (such as, the engine compartment, the wheel wells, etc.) to measure properties in the interior of the vehicle 110. For example, such sensors 120 may include accelerometers, odometers, tachometers, pitch and yaw sensors, wheel speed sensors, microphones, tire pressure sensors, and biometric sensors, etc. In the illustrated example, the sensors 120 are object-detecting and range-finding sensors (e.g., a camera, lidar, radar, ultrasonic, etc.). In some examples, the sensors 120 are mounted at the front and rear of the vehicle 110. The sensors 120 detect objects (e.g., the trailer 160, the driver 180, etc.) about the vehicle 110. In other words, the sensors 120 generate obstruction information and range finding information for the vehicle 110.

The example transceiver 140 includes antenna(s), radio(s) and software to broadcast messages and to establish connections between the vehicle 110 and the remote device 170.

The OBCP 150 controls various subsystems of the vehicle 110. In some examples, the OBCP 150 controls power windows, power locks, an immobilizer system, and/or power mirrors, etc. In some examples, the OBCP 150 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In some examples, the OBCP 150 processes information from the sensors 120 to execute and support remote-control vehicle maneuvering features and automated vehicle maneuvering features. Using steering commands from the remote device 170, the OBCP 150 determines steering and countersteering angles for the wheels 112 to move the trailer 160 along the path 190 indicated by the driver 180, stops the vehicle 110 if the driver 180 releases a keep-alive switch on the remote device 170, and/or determines whether to prompt the driver 180 to review the vehicle's 110 surroundings, and/or stops the vehicle 110 if a connection with the remote device is lost.

In the examples of FIGS. 1, 2, 5, and 6, the remote device 170 is a smartphone. The remote device 170 may also be, for example, a cellular telephone, a tablet, a key fob, etc. The remote device 170 includes a transceiver to send and receive messages from the transceiver 140. The remote device 170 also includes accelerometers and pitch and yaw sensors to determine an orientation of the remote device 170. The remote device 170 includes a touch sensitive display 172, and volume up and down buttons 174, 176. The driver 180 remotely controls the vehicle 110 via inputs to the display 172. The volume up and down buttons 174, 176 serve as keep-alive switches during remote control of the vehicle 110. In some examples, the display 172 also serves as a keep-alive switch during remote control of the vehicle 110. In other words, the remote device 170 generates orientation information, movement request information, and keep-alive information. The remote device 170 transmits the orientation information, the movement request information, and the keep-alive information to the vehicle 110 as wireless signals.

In operation during a remote-controlled vehicle maneuver, the remote device 170 serves as a user interface for the driver 180 to control movement of the vehicle 110 along a simplified path 190. More specifically, the OBCP 150 determines and controls steering of the vehicle 110 to move the trailer 160 and the vehicle 110 along the path 190. In other words, the driver 180 inputs the desired path 190 to the vehicle 110 via the remote device 170 and the vehicle 110 converts the desired path 190 into steering angles of the wheels 112 to steer and countersteer both the trailer 160 and the vehicle 110 along the path 190. In some examples, the driver 180 may control the speed of the vehicle 110 via the remove device 170.

Figure 3:
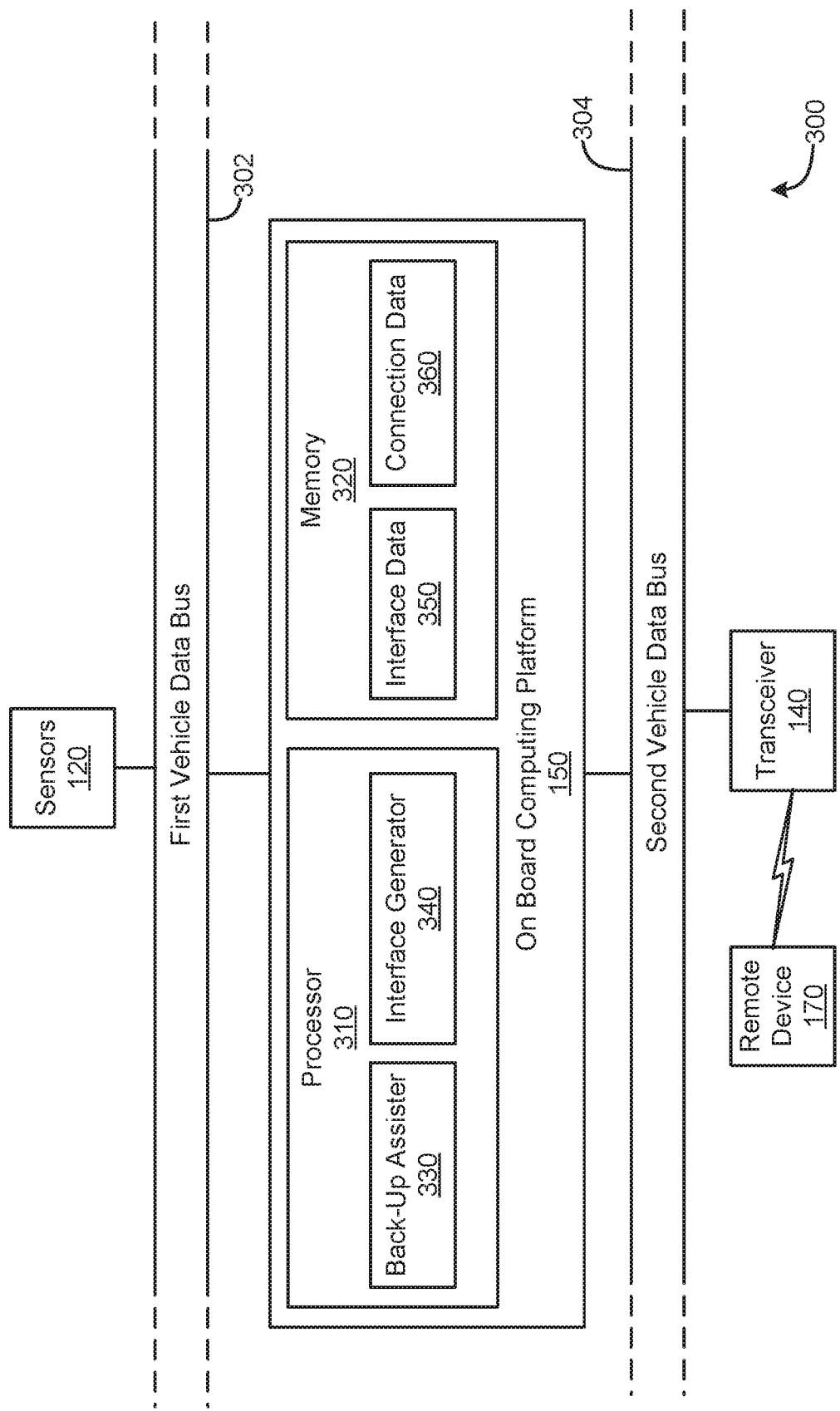
FIG. 3 is a block diagram of the electronic components of the vehicle of FIG. 1.
Figure 4:
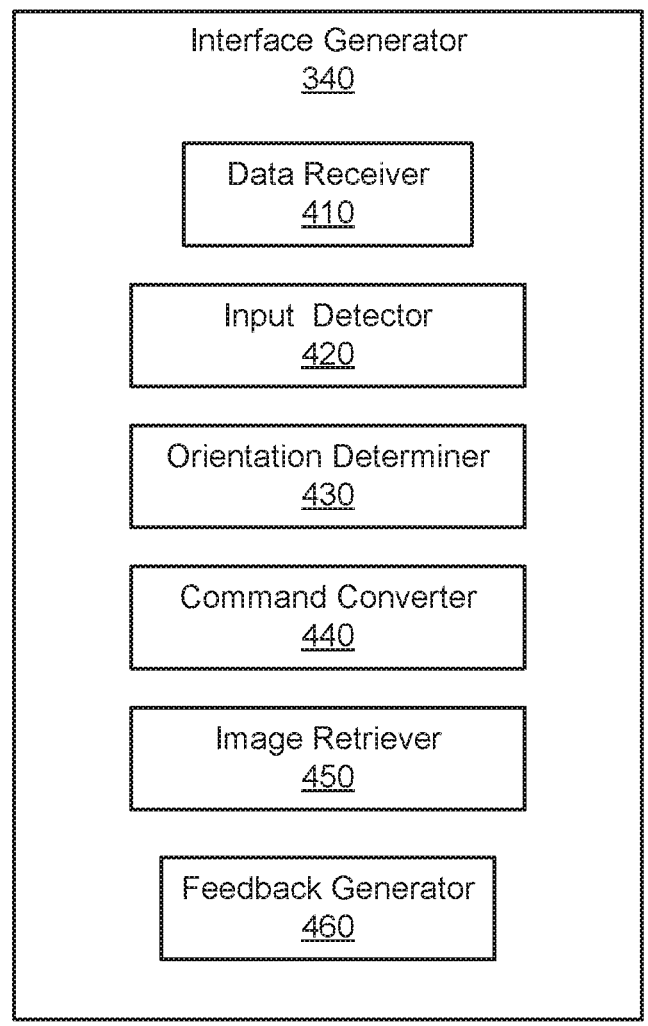
FIG. 4 is a more detailed block diagram of the interface generator of FIG. 3.
Figure 5:
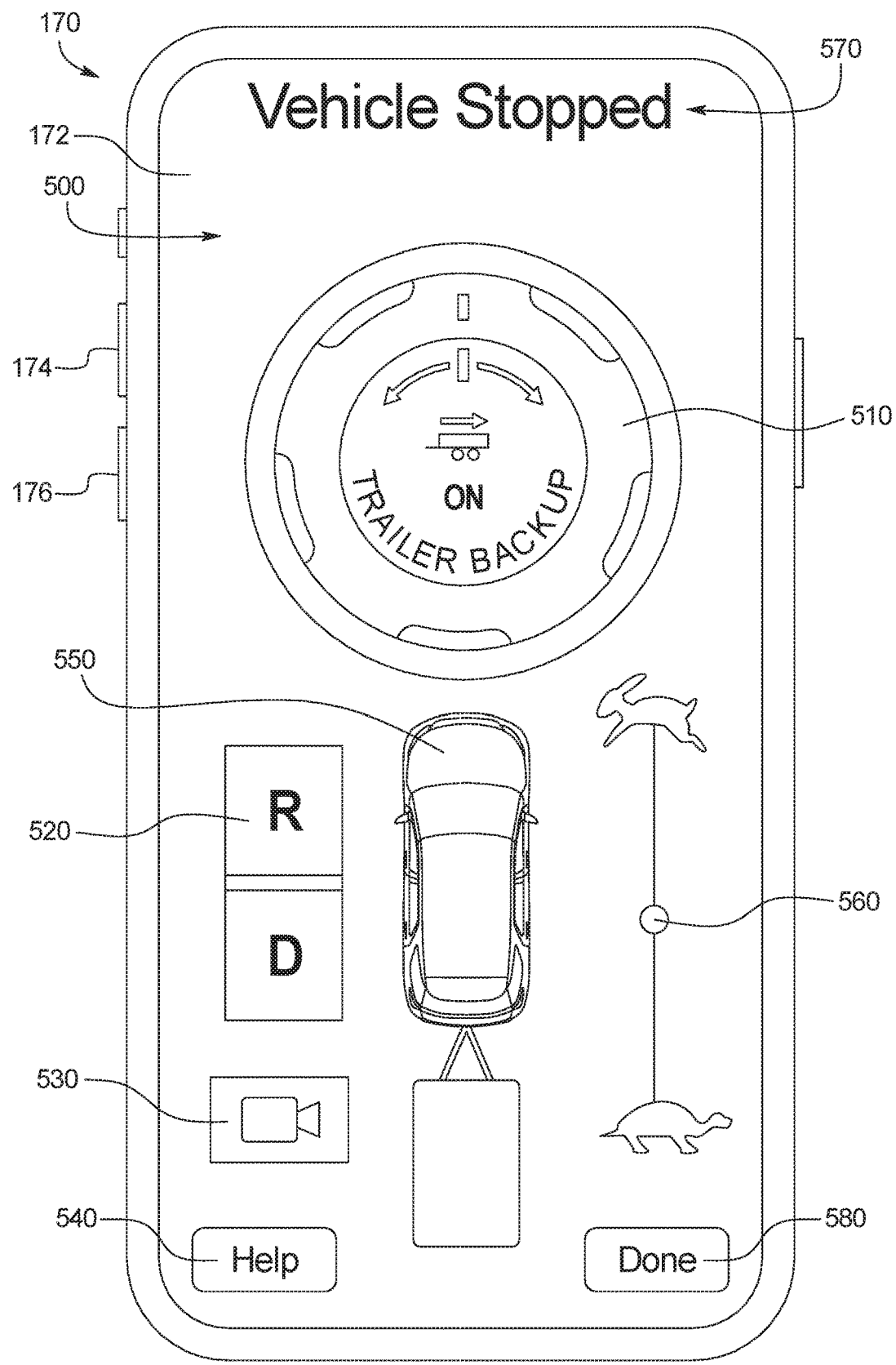
FIG. 5 illustrates an example remote vehicle maneuvering interface generated by the interface generator of FIG. 3.
Figure 6:
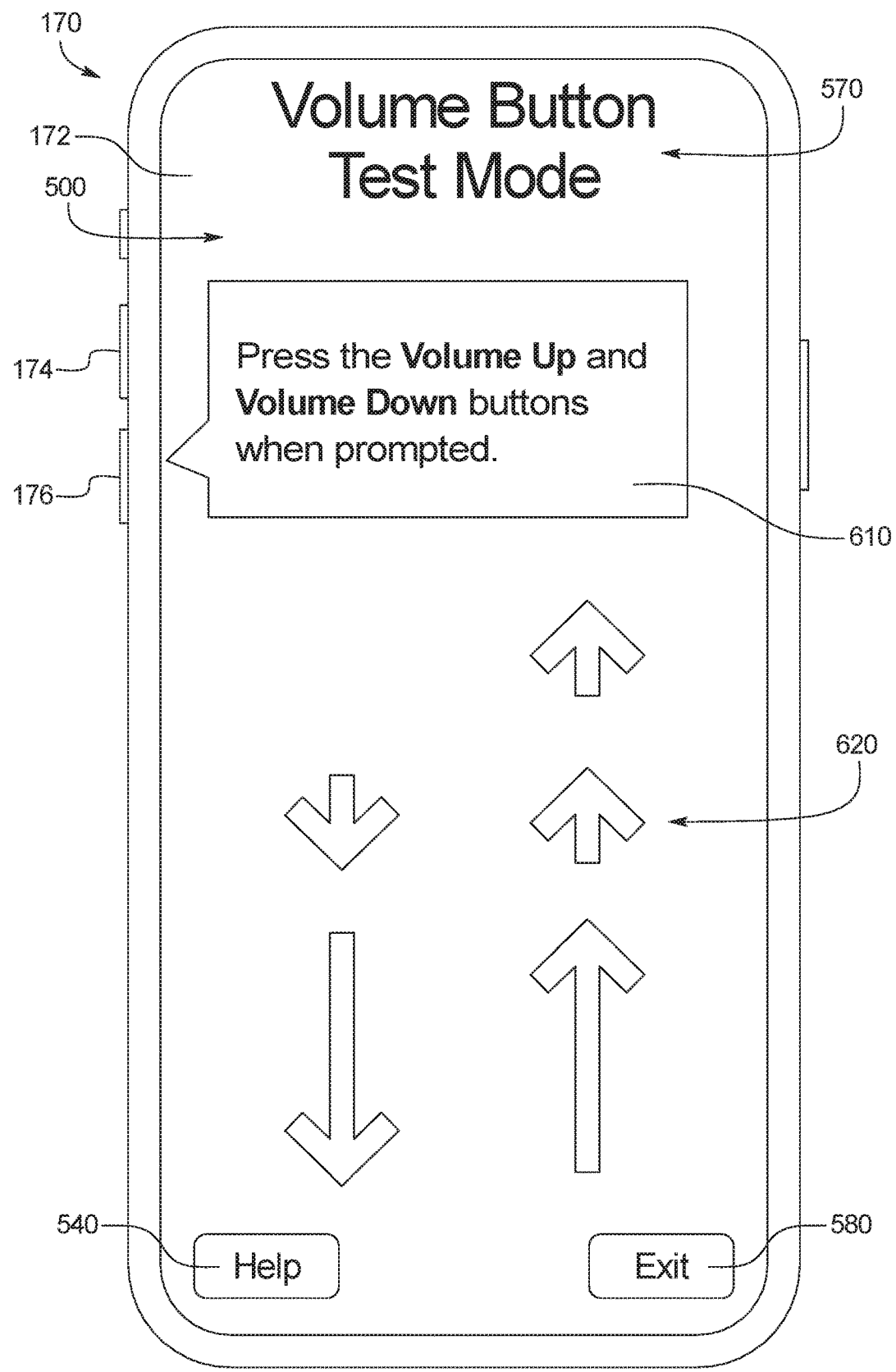
FIG. 6 illustrates an example test mode interface generated by interface generator of FIG. 3.

FIG. 3 is a block diagram of the electronic components 300 of the vehicle 110. FIG. 4 is a more detailed block diagram of an interface generator 340 of FIG. 3. FIG. 5 illustrates an example remote vehicle maneuvering interface generated by the interface generator 340. FIG. 6 illustrates an example test mode interface generated by interface generator 340.

As shown in FIG. 3, the first vehicle data bus 302 communicatively couples the sensors 120, the OBCP 150, and other devices connected to the first vehicle data bus 302. In some examples, the first vehicle data bus 302 is implemented in accordance with the controller area network (CAN) bus protocol as defined by International Standards Organization (ISO) 11898-1. Alternatively, in some examples, the first vehicle data bus 302 may be a Media Oriented Systems Transport (MOST) bus, a CAN flexible data (CAN-FD) bus (ISO 11898-7), or an Ethernet bus. The second vehicle data bus 304 communicatively couples the OBCP 150 and the transceiver 140. The remote device 170 is in wireless communication with the transceiver 140. The second vehicle data bus 304 may be a MOST bus, a CAN bus, a CAN-FD bus, or an Ethernet bus. In some examples, the OBCP 150 communicatively isolates the first vehicle data bus 302 and the second vehicle data bus 304 (e.g., via firewalls, message brokers, etc.). Alternatively, in some examples, the first vehicle data bus 302 and the second vehicle data bus 304 are the same data bus.

The OBCP 150 includes a processor or controller 310 and memory 320. In the illustrated example, the OBCP 150 is structured to include a back-up assister 330 and the interface generator 340. Alternatively, in some examples, the back-up assister 330 and the interface generator 340 may be incorporated into another electronic control unit (ECU) with its own processor 310 and memory 320.

In operation, the back-up assister 330 determines steering and countersteering angles to push the trailer along the simplified path 190 in reverse. The back-up assister 330 communicates with the steering of the vehicle 110 to turn the wheels 112 of the vehicle 110 at appropriate points based on predetermined dimensions of the vehicle 110, the trailer 160, and the towing hitch 130 and on image data from the sensors 120. The back-up assister 330 communicatively connects the powertrain of the vehicle 110 with the remote device 170. Thus, the remote device 170 may remotely control the rotational speed and direction of the wheels of vehicle 110.

In operation, the interface generator 340 connects with the remote device 170, determines an orientation of the remote device 170, determines whether keep-alive switches are being held, determines whether a travel direction change is requested, determines whether a connection with the remote device 170 is adequately robust, determines whether to end back-up assistance, and converts commands from the remote device 170 for use by the back-up assister 330. The interface generator 340 makes these determinations based on signals from the remote device 170 and obstruction information and range finding information from the sensors 120.

The processor or controller 310 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 320 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 320 includes multiple kinds of memory, particularly volatile memory and non-volatile memory.

The memory 320 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 320, the computer readable medium, and/or within the processor 310 during execution of the instructions. The memory 320 stores interface data 350 and connection data 360.

As shown in FIGS. 5 and 6, the interface data 350 includes graphical rendering data to display a graphical interface 500 via the display 172 of the remote device 170. In the example of FIG. 5, the graphical interface 500 is under a run mode and includes a virtual steering knob 510, a direction selector 520, an image requester button 530, a help requester button 540, a dynamic illustration 550, a speed selector 560, a message field 570, and an exit button 580. The virtual knob 510 is twisted by the driver touching and rotating the virtual knob 510 via the touch sensitive display 172. In some examples, the virtual knob 510 is configured to return to a neutral position when the driver 180 ceases touching the virtual know 510 (e.g., snap back to center, etc.). In some examples, the virtual knob 510 serves as a keep-alive switch in addition or as an alternative to the volume up/down buttons 174, 176. In such examples, the driver must touch and hold the virtual knob 510 to enable movement of the vehicle 110. The direction selector 520 shifts the vehicle 110 between forward movement and reverse movement. The image requester button 530 requests images from the front and/or rear camera sensors 120 to display on the display 172. The dynamic illustration 550 includes representations of the vehicle 110 and the trailer 160. In the dynamic illustration 550, the trailer pivots relative to the vehicle as the virtual knob 510 is rotated. The pivot angle between the trailer and the vehicle of the dynamic illustration 550 indicates in what direction the trailer 160 will be moved and/or is being moved by the vehicle 110. In other words, graphical interface 500 provides vehicle controls for the vehicle 110 and movement information for the trailer 160 to the driver 180.

As shown in FIG. 6, the interface data 350 includes testing data to test the display 172 and the volume up and down buttons 174, 176 as keep-alive switches. As shown in the example of FIG. 6, the graphical interface 500 is under a keep-alive switch test mode and includes an instructional prompt 610 and testing prompts 620. The instructional prompt 610 instructs the driver to press the volume up and down buttons 174, 176 according to the testing prompts 620. During the test, the driver 180 presses the volume up and down buttons 174, 176 as directed by the testing prompts 620. In the example of FIG. 6, the testing prompts 620 scroll along the display 172. As shown in FIG. 6, the test mode prompts the driver 180 to press the volume up and down buttons 174, 176 individually or simultaneously for varying lengths of time.

The connection data 360 may include thresholds and/or ranges for wireless signal flight times, strengths, arrival angles, and/or reception times. Wireless signals from the remote device 170 that are below the thresholds and/or outside of the ranges are indicative of a poor or otherwise improper connection with the vehicle 110. It should be understood and appreciated that the interface data 350 depicted in FIGS. 3, 5, and 6 is an example and that a graphical interface 500 in the memory 320 may include additional vehicle controls, dynamic illustrations, instructional prompts 610, testing prompts 620, etc. It should also be understood that the interface data 350 and the connection data 360 may be updated. Updates to the interface data 350 and/or the connection data 360 may be performed via the transceiver 140, an infotainment head unit (IHU), and/or an on board diagnostics (OBD) port of the vehicle 110.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

As shown in FIG. 4, the interface generator 340 includes a data receiver 410, an input detector 420, an orientation determiner 430, a command convertor 440, an image retriever 450, and a feedback generator 460.

In operation, the data receiver 410 receives obstruction information and range finding information sent by the sensors 120. More specifically, the data receiver 410 receives images, reflections, and echoes of obstructions behind the vehicle 110 captured by the sensors 120. The data receiver 410 also receives orientation information, movement request information, and keep-alive information from the remote device 170. Additionally, the data receiver 410 receives strengths, arrival times, and/or arrival angles of the wireless signals from the remote device 170. The data receiver 410 establishes a wireless connection between the vehicle 110 and the remote device 170.

In operation, the input detector 420 detects and sorts movement requests, orientation change signals, image requests, quit requests, and keep-alive signals from the remote device 170. More specifically, the input detector 420 detects whether the volume up and/or down buttons 174, 176 and the virtual knob 510 are being held by the driver 180. In some examples, both the volume up and down buttons 174, 176 must be pressed to permit (e.g., keep alive) remote maneuvering of the vehicle 110. In some examples, both the volume up and down buttons 174, 176 and the virtual knob 510 must be pressed to permit (e.g., keep alive) remote maneuvering of the vehicle 110. In some examples, at least two of the virtual knob 510, the volume up button 174, and the volume down button 176 must be pressed to permit (e.g., keep alive) remote maneuvering of the vehicle 110. The input detector 420 sends the orientation change signals to the orientation determiner 430. The input detector 420 sends the movement requests, quit requests, the keep-alive determination to the command convertor 440. The input detector 420 sends the movement requests and the image requests to the image retriever 450.

Additionally, in operation, the input detector 420 determines whether the connection between the remote device 170 and the vehicle 110 is robust enough to remotely control the vehicle 110. Methods by which the input detector 420 determines connection strength include, for example, time-of-flight analysis, signal strength analysis, angle of arrival analysis, dead reckoning, etc. For example, the input detector 420 may compare signal flight times, strengths, arrival angles, and/or reception times to the connection data 360 stored in the memory 320.

In operation, the orientation determiner 430 determines whether to rotate the graphical interface 500 in the display 172 based on the orientation change signals. More specifically, the orientation determiner 430 analyzes signals from the accelerometers of the remote device 170 to determine whether the driver 180 has moved the remote device 170 from one hand to another, rotated the remote device 170, is holding the remote device 170 at his or her side, etc. In other words, the orientation determiner 430 makes an orientation determination of whether to flip the graphical interface 500 such that the graphical interface 500 is correct side up as viewed by the driver 180. In some examples, the graphical interface 500 is correct side up when the message field 570 is legible and/or the virtual knob 510 is next to the volume up and down buttons 174, 176. If the graphical interface 500 is incorrectly oriented in the display 172, the orientation determiner 430 transmits reorientation commands to the remote device 170.

In operation, the command convertor 440 converts movement requests from the remote device 170 into signals usable by the back-up assister 330. Movement requests include signals to control rotation of the wheels 112, steer the wheels 112, stop the vehicle 110, and/or shift the vehicle 110. More specifically, the command convertor 440 transforms the movement requests from information protocols used by the remote device 170 into information protocols used by a physical steering knob, shifter, and brake and accelerator pedals for delivery to the back-up assister 330. Additionally, the command convertor 440 sends stop commands to the back-up assister 330 based on quit requests, the keep-alive determination, and/or the connection determination from the input detector 420.

In operation, the image retriever 450 retrieves images from the front and/or rear camera sensors 120 based on image requests made via the image requester button 530 and/or shift requests made via the direction selector 520. More specifically, after receiving an image request, the image retriever 450 engages the front and/or rear camera sensors 120 to direct images of the environment 100 about the vehicle to the display 172. A driver 180 may request these images to look for obstructions while remotely maneuvering the vehicle 110. In some examples, the image retriever 450 may transmit images of the environment 100 to the display 172 whenever a shift request is made by the driver 180. In other words, the image retriever 450 prompts the driver 180 to check for obstructions that may not be visible from the driver's 180 vantage point (e.g., the child 103 shown in FIG. 1) before changing the travel direction of the vehicle 110.

Figure 7:
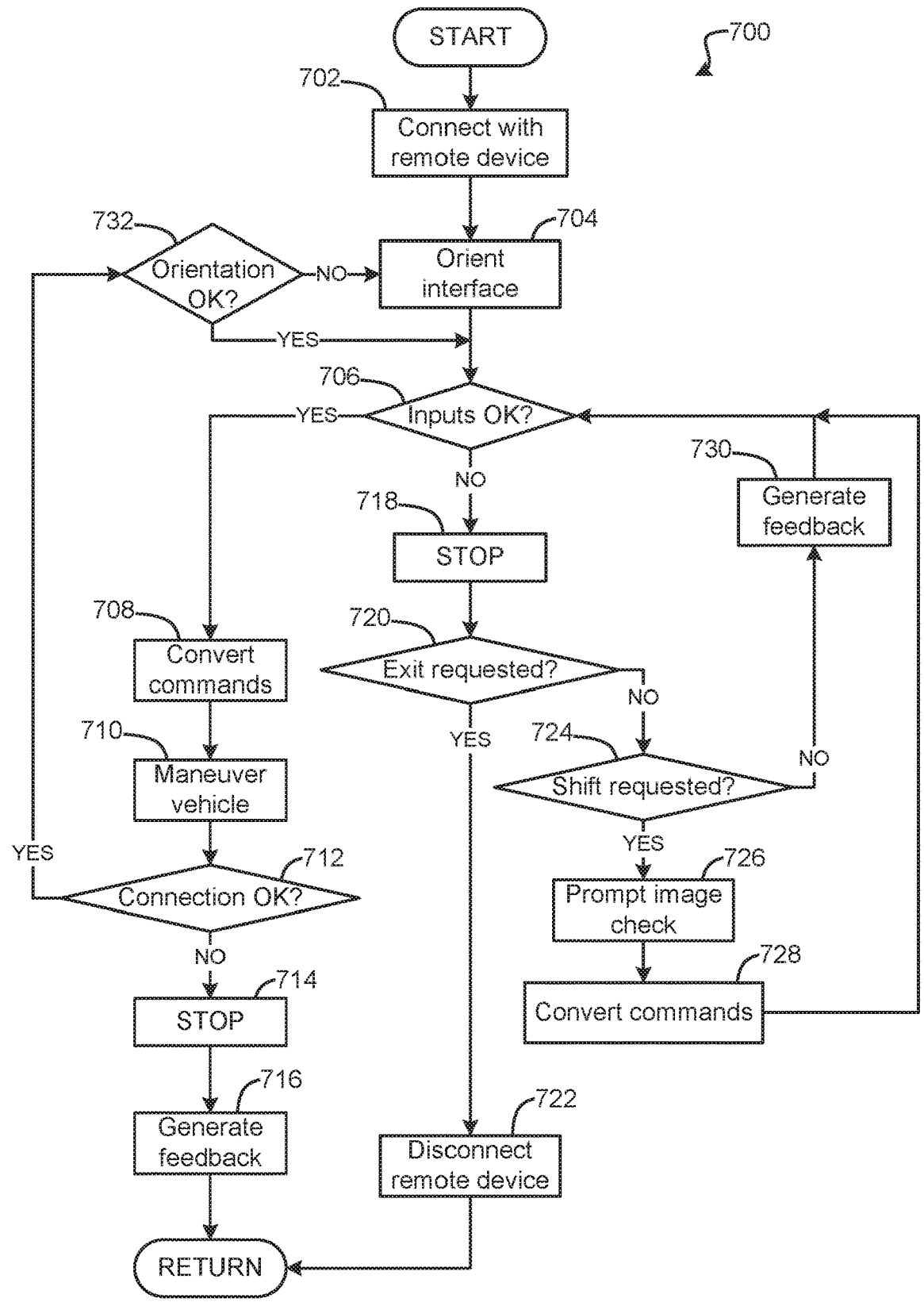
FIG. 7 is a flowchart of a method to control the vehicle of FIG. 1 during a remote-controlled maneuver, which may be implemented by the electronic components of FIG. 3.

In operation the feedback generator 460 generates feedback based on the keep-alive determinations and the connection determinations. More specifically, the feedback generator 460 generates audio messages and/or visual messages warning a driver 180 that remote vehicle maneuvering is unavailable because the volume up and down buttons 174, 176 have been released and/or because the connection between the vehicle 110 and the remote device 170 is poor or otherwise improper. Further, the feedback generator 460 transmits the messages for display via the display 172. In some examples, the messages are shown in the message field 570. FIG. 7 is a flowchart of a method 700 to remotely maneuver the vehicle 110, which may be implemented by the electronic components 300 of FIG. 3. The flowchart of FIG. 7 is representative of machine readable instructions stored in memory (such as the memory 320 of FIG. 3) that comprise one or more programs that, when executed by a processor (such as the processor 310 of FIG. 3), cause the vehicle 110 to implement the example back-up assister 330 and interface generator 340 of FIGS. 3 and 4. Further, although the example program(s) is/are described with reference to the flowchart illustrated in FIG. 7, many other methods of implementing the example interface generator 340 may alternatively be used. For example, the order of execution of the blocks may be changed, and/or some of the blocks described may be changed, eliminated, or combined.

Initially, at block 702, the data receiver 410 establishes a connection between the vehicle 110 and the remote device 170. As discussed above, the data receiver 410 receives wireless signals from the remote device 170.

At block 704, the orientation determiner 430 orients the graphical interface 500 in the display 172. More specifically, the orientation determiner 430 determines whether to rotate the graphical interface 500 in the display 172 based on orientation information from accelerometers of the remote device 170, as discussed above.

At block 706, the input detector 420 determines whether the wireless signals from the remote device 170 include keep-alive inputs. More specifically, the input detector 420 analyzes the wireless signals from the remote device 170 to determine whether the driver 180 is maintaining pressure on the volume up and/or down buttons 174, 176, as discussed above. It should be understood and appreciated that the volume up and down buttons 174, 176 act as keep-alive switches. In other words, to keep the vehicle 110 under remote maneuvering, the driver 180 must press one or more of the volume up and down buttons 174, 176.

If, at block 706, the input detector 420 determines that the wireless signals from the remote device 170 include keep-alive inputs, the method 700 proceeds to block 708.

If, at block 706, the input detector 420 determines that the wireless signals from the remote device 170 do not include keep-alive inputs, the method 700 proceeds to block 718.

At block 708, the command convertor 440 converts movement requests from the remote device 170 into commands for the back-up assister 330. More specifically, the command convertor 440 transforms the movement requests from the remote device 170 information protocol to the back-up assister information protocol, as discussed above. The method 700 then proceeds to block 710.

At block 710, the back-up assister 330 maneuvers the vehicle 110. More specifically, the back-up assister 330 steers and rotates the wheels 112 according to the movement requests from the remote device 170, as discussed above. The method 700 then proceeds to block 712.

At block 712, the input detector 420 determines whether the connection between the remote device 170 and the vehicle 110 is robust. More specifically, the input detector 420 accesses connection data 360 stored in the memory 320 and compares signal flight times, strengths, arrival angles, and/or reception times to the connection data 360, as discussed above.

If, at block 712, the input detector 420 determines that the connection between the remote device 170 and the vehicle 110 is robust, the method 700 proceeds to block 732.

If, at block 712, the input detector 420 determines that the connection between the remote device 170 and the vehicle 110 is not robust, the method 700 proceeds to block 714.

At block 714, the command convertor 440 instructs the back-up assister 330 to stop the vehicle 110. More specifically, the command convertor 440 commands the back-up assister 330 to stop rotating the wheels 112 based on the poor connection determination, as discussed above. The method 700 proceeds to block 716.

At block 716, the feedback generator 460 generates feedback regarding the stopped vehicle 110. More specifically, the feedback generator 460 transmits a message to the remote device 170 informing the driver 180 of the poor connection, as discussed above. The method 700 then returns to block 702.

At block 732, the orientation determiner 430 determines whether the orientation of the graphical interface 500 is correct side up based on accelerometer information from the remote device, as discussed above.

If, at block 732, the orientation determiner 430 determines that the orientation of the graphical interface 500 is correct side up, the method 700 returns to block 706.

If, at block 732, the orientation determiner 430 determines that the orientation of the graphical interface 500 is not correct side up, the method 700 returns to block 704.

Referring back to block 718, the command convertor 440 instructs the back-up assister 330 to stop the vehicle 110. More specifically, the command convertor 440 commands the back-up assister 330 to stop rotating the wheels 112 based on the driver 180 releasing one or more of the keep-alive volume up and down buttons 174, 176, as discussed above. The method proceeds to block 720.

At block 720, the input detector 420 determines whether the driver 180 sent a quit request via the exit button 580 of the graphical interface 500, as discussed above.

If, at block 720, the input detector 420 determines that the driver 180 sent a quit request, the method proceeds to block 722.

If, at block 720, the input detector 420 determines that the driver 180 did not send a quit request, the method proceeds to block 724.

At block 722, the input detector 420 ends the connection with the remote device 170 to close the graphical interface 500. The method then returns to block 702.

At block 724, the input detector 420 determines whether the driver 180 sent a shift request via the direction selector 520 of the graphical interface 500, as discussed above.

If, at block 724, the input detector 420 determines that the driver 180 sent a shift request, the method proceeds to block 726.

If, at block 724, the input detector 420 determines that the driver 180 did not send a shift request, the method proceeds to block 730.

At block 726, the image retriever 450 prompts the driver 180 to review images of the surroundings of the vehicle 110. More specifically, the image retriever engages the camera sensors 120 to transmit images to the remote device 170, as discussed above. The method 700 then proceeds to block 728.

At block 728, the command convertor 440 converts the shift request into a command usable by the back-up assister 330 and sends the command to the back-up assister 330, as discussed above. The method 700 then returns to block 706.

At block 730, the feedback generator 460 generates feedback regarding the stopped vehicle 110. More specifically, the feedback generator 460 transmits a message to the remote device 170 informing the driver 180 of the released keep-alive volume up and down buttons 174, 176, as discussed above. The method 700 then returns to block 706.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

From the foregoing, it should be appreciated that the above disclosed apparatus and methods may aid drivers by allowing drivers to remotely control vehicle maneuvers while preventing accidental and/or unintentional vehicle movement. By allowing drivers to remotely control their vehicles, drivers may more closely observe the vehicle maneuver. In instances where the vehicle maneuver is assisted guidance of a hitched trailer, the driver may observe whether the trailer is approaching obstacles (e.g., pedestrians, curbs, posts) that would otherwise be difficult to see from inside the vehicle. Thus, remote control of the assisted trailer guidance may prevent contact between the vehicle and/or the trailer and obstacles. It should also be appreciated that the disclosed apparatus and methods provide a specific solution—remote trailer guidance assistance—to a specific problem—potential contact of vehicles and/or hitched trailers with obstacles during maneuvers. Further, the disclosed apparatus and methods provide an improvement to computer-related technology by increasing functionality of a processor to receive a plurality of types of inputs from a remote device, detect and sort the input types, orient a graphical interface displayed via the remote device based on the inputs, convert the input types for use in hitched trailer guidance, retrieve images from sensors, and generate feedback for display via the remote device based on the inputs.

As used here, the terms "module" and "unit" refer to hardware with circuitry to provide communication, control and/or monitoring capabilities, often in conjunction with sensors. "Modules" and "units" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment (s) without substantially departing from the spirit and principles of the techniques described herein. All modifications are intended to be included herein within the scope of this disclosure and protected by the following claims.

What is claimed is:

1. A vehicle comprising:
    wheels;
    a transceiver; and
    a processor and memory in communication with a remote device via the transceiver and configured to:
        determine that a first button and a second button of the remote device are pressed based on signals from the remote device;
        determine that a graphical interface of the remote device is pressed based on signals from the remote device; and
        cause, based on a determination that the first button, second button, and graphical interface of the remote device are all being pressed at the same time, a rotation of the wheels.
2. The vehicle of claim 1, wherein the processor is configured to rotate the wheels when the first and second buttons are pressed by a driver.
3. The vehicle of claim 1, wherein the processor is configured to:
    determine whether a connection strength between the transceiver and the remote device is below a threshold stored in the memory; and
    if the connection strength is below the threshold, the processor is configured to stop rotation of the wheels.
4. The vehicle of claim 1, further comprising a camera in communication with the processor, wherein the processor is configured to transmit an image from the camera to the remote device based on a shift request from the remote device.
5. The vehicle of claim 1, wherein the processor is configured to:
    determine whether a graphical interface for remote control of the vehicle displayed via the remote device is oriented correct side up; and
    if the graphical interface is incorrectly oriented, transmit a reorientation command to the remote device.
6. The vehicle of claim 5, wherein the graphical interface includes a virtual knob to control steering of the wheels.
7. The vehicle of claim 1, wherein the first and second buttons are physical volume up and volume down buttons, respectively.
8. A method comprising:
    determining, with a processor, that a first button and a second button of a remote device are pressed based on signals from the remote device;
    determining, with the processor, that graphical interface of the remote device is pressed based on signals from the remote device; and
    causing, based on a determination that the first button, second button, and graphical interface of the remote device are all being pressed at the same time, a rotation of wheels of vehicle.
9. The method of claim 8, further comprising rotating, with the processor, the wheels when the first and second buttons are pressed.
10. The method of claim 8, further comprising;
    determining, with the processor, whether a connection strength between a transceiver of the vehicle and the remote device is below a threshold; and
    stopping, with the processor, rotation of the wheels if the connection strength is below the threshold.
11. The method of claim 8, further comprising transmitting, with the processor, an image from a camera of the vehicle to the remote device based on a shift request from the remote device.
12. The method of claim 8, further comprising:
    determining, with the processor, whether a graphical interface for remote control of the vehicle displayed via the remote device is oriented correct side up based on orientation information from the remote device; and
    transmitting, with the processor, a reorientation command to the remote device if the graphical interface is incorrectly oriented.
13. The method of claim 12, wherein the graphical interface includes a virtual knob to control steering of the wheels.
14. The method of claim 8, wherein the first and second buttons are physical volume up and volume down buttons, respectively.
15. A system comprising:
    a remote device comprising a display and physical first and second buttons and configured to display a graphical interface having a virtual steering knob and a direction selector; and
    a vehicle comprising:
        wheels;
        a transceiver; and
        a processor and memory in communication with the remote device via the transceiver and configured to:
            control the wheels based on inputs made to the remote device via the graphical interface;
            determine that the first button and second button are pressed based on signals from the remote device;
            determine that the graphical interface of the remote device is pressed based on signals from the remote device; and
            cause, based on a determination that the first button, second button, and graphical interface of the remote device are all being pressed at the same time, a rotation of the wheels.
16. The system of claim 15, wherein the processor is configured to rotate the wheels when the physical first and second buttons are pressed by a driver.
17. The system of claim 15, wherein the processor is configured to:
    determine whether the graphical interface is oriented correct side up in the display; and if the graphical interface is incorrectly oriented, transmit a reorientation command to the remote device.

18. The system of claim 17, wherein the vehicle further comprises a camera in communication with the processor and the processor is configured to transmit an image from the camera to the remote device based on a shift request made via the direction selector.

* * * * *